United States Patent
Heimbuch (10) Patent No.: US 10,730,357 B2
(45) Date of Patent: Aug. 4, 2020

(54) LIFT LINK ASSEMBLY OF A THREE-POINT HITCH

(71) Applicant: DEERE & COMPANY, Moline, IL (US)

(72) Inventor: Benjamin J. Heimbuch, Waterloo, IA (US)

(73) Assignee: Deere & Company, Moline, IL (US)

( * ) Notice: Subject to any disclaimer, the term of this patent is extended or adjusted under 35 U.S.C. 154(b) by 196 days.

(21) Appl. No.: 15/940,068

(22) Filed: Mar. 29, 2018

(65) Prior Publication Data

US 2019/0299731 A1   Oct. 3, 2019

(51) Int. Cl.
   *B60D 1/42*   (2006.01)
   *B60D 1/00*   (2006.01)

(52) U.S. Cl.
   CPC .......... *B60D 1/42* (2013.01); *B60D 2001/008* (2013.01)

(58) Field of Classification Search
   None
   See application file for complete search history.

(56) References Cited

U.S. PATENT DOCUMENTS

| | | | |
|---|---|---|---|
| 4,034,999 A | 7/1977 | Jackson | |
| 4,194,757 A | 3/1980 | Lucas et al. | |
| 4,418,935 A | 12/1983 | O'Connor | |
| 6,056,069 A * | 5/2000 | Hagen | A01B 59/004 |
| | | | 172/679 |
| 6,148,927 A | 11/2000 | Hoffart | |
| 7,658,569 B2 * | 2/2010 | de Oliveira | A01B 59/004 |
| | | | 403/322.4 |
| 7,938,206 B2 | 5/2011 | Buhrke et al. | |
| 9,491,898 B2 * | 11/2016 | Laubner | A01B 59/004 |
| 9,788,471 B2 | 10/2017 | Buttjer | |
| 10,143,124 B2 * | 12/2018 | Shaw | A01B 59/004 |
| 2013/0037283 A1 | 2/2013 | Laubner et al. | |

FOREIGN PATENT DOCUMENTS

| | | | | |
|---|---|---|---|---|
| DE | 1238706 B | | 4/1967 | |
| DE | 333472 A1 * | | 4/1985 | ....... A01B 59/004 |
| EP | 2540149 A1 * | | 1/2013 | ....... A01B 59/067 |
| GB | 2460657 | * | 12/2009 | ....... A01B 59/004 |

OTHER PUBLICATIONS

English Translation of DE3334472 (Year: 1985).*
Benjamin J. Heimbuch, Photos taken at Agritechnica Farm Show at the GKN-Walterscheid booth, 2011 (3 page).
Benjamin J. Heimbuch, Portion of a John Deere Three-Point Hitch Assembly, available to the public before Dec. 9, 2016 (1 page).
German Search Report issued in counterpart application No. 102019202595.1 dated Nov. 7, 2019. (12 pages).

* cited by examiner

*Primary Examiner* — Jacob D Knutson
*Assistant Examiner* — Harold Eric Pahlck, III (57) ABSTRACT

A lift link assembly of a three-point hitch. The lift link assembly includes a yoke, a shaft, and a retractor. The yoke includes a main housing and first and second side arms that extend downwardly therefrom. The shaft includes a shank and a head positioned on a lower-end thereof, and the shank is positioned in the upper-end through hole. When the lift link assembly is in a retracted mode, the retractor is positioned above the head, the retractor is configured to apply a downward force to the head, and the retractor is configured to apply an upward force to the yoke.

20 Claims, 8 Drawing Sheets

LIFT LINK ASSEMBLY OF A THREE-POINT HITCH

FIELD OF THE DISCLOSURE

The present disclosure relates to a lift link assembly of a three-point hitch. The lift link assembly is configured to be adjustable between a retracted mode, a floating mode, and an extended mode.

BACKGROUND OF THE DISCLOSURE

Agricultural and industrial work machines may include a three-point hitch for attaching an implement to the work machine. The three-point hitch and, thus, the implement may be raised and lowered.

When transporting the work machine and implement, the three-point hitch may be raised to a top position by a pair of lift cylinders, and a lift link may be shortened to its shortest length. This raises the three-point hitch and implement, so that there is a clearance between the implement and the ground.

Similarly, when the work machine is pulling a secondary implement attached to a drawbar, the three-point hitch may be raised to the top position by the pair of lift cylinders, and the lift link may be shortened to it shortest length. In combination, this raises the three-point hitch and implement, so that there is clearance between the implement (e.g., plow) and the secondary implement (e.g., wagon).

In known three-point hitches, shortening the lift link requires rotating a manually operated rotatable length adjuster. Turning the rotatable length adjuster may be time consuming and difficult. Further, the length of the lift link is typically set to an ideal length for using a given implement. Thus, when the lift link is shortened with the adjuster to transport the implement, for example, it may be difficult to determine how many times to counter rotate the adjuster to return the lift link to its ideal length for using the implement.

SUMMARY OF THE DISCLOSURE

Disclosed is a lift link assembly of a three-point hitch. The lift link assembly includes a yoke, a shaft, and a retractor. The yoke includes a main housing, and first and second side arms that extend downwardly therefrom. The shaft includes a shank and a head positioned on a lower-end thereof, and the shank is positioned in the upper-end through hole. When the lift link assembly is in a retracted mode, the retractor is positioned above the head, the retractor is configured to apply a downward force to the head, and the retractor is configured to apply an upward force to the yoke. The retracted mode may be used for storage and or transport of an implement, while the floating and extended modes may be used for work operations associated with the implement.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
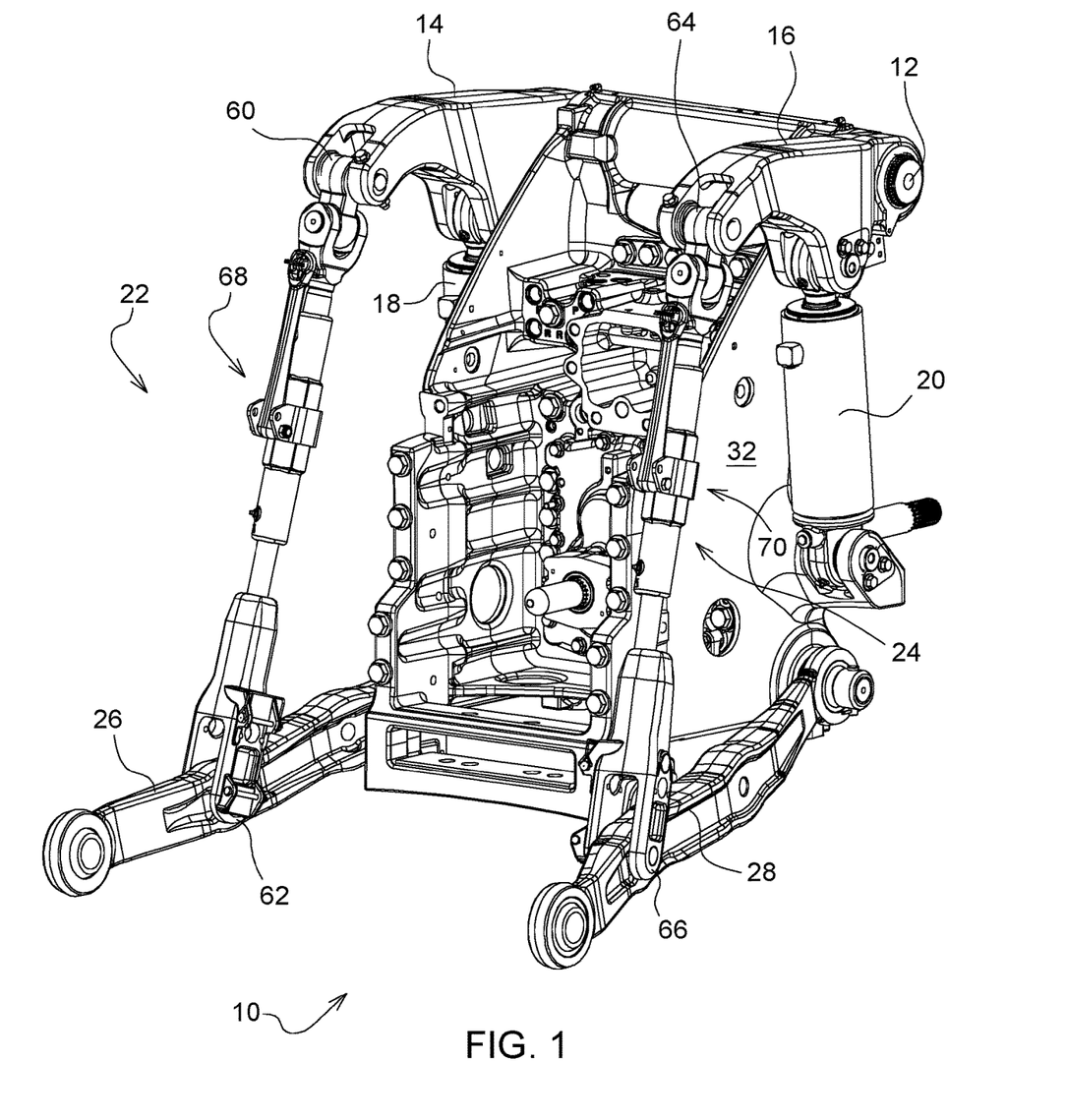
FIG. 1 is a perspective view of a three-point hitch.

Referring to FIG. 1, there is shown a perspective view of a three-point hitch 10. The three-point hitch 10 may be part of a work machine, such as an agricultural tractor or an industrial work machine, and it may be used to mount implements to the work machine. The three-point hitch 10 may include a rocker shaft 12, a left rocker arm 14, a right rocker arm 16, a left lift cylinder 18, a right lift cylinder 20, a left lift link assembly 22, a right lift link assembly 24, a left draft link 26, a right draft link 28, and an upper link (not shown so as to highlight the other components of the three-point hitch 10).

An end of the left rocker arm 14 may be coupled to an end of the rocker shaft 12, and an end of the right rocker arm 16 may be coupled to an opposite end the rocker shaft 12.

A first end 60 of the left lift link assembly 22 may be rotatably coupled to an opposite end of the left rocker arm 14, and a second end 62 of the left lift link assembly 22 may be rotatably coupled to the left draft link 26. A first end 64 of the right lift link assembly 24 may be rotatably coupled to an opposite end of the right rocker arm 16, and a second end 66 of the right lift link assembly 24 may be rotatably coupled to the right draft link 28. The left lift link assembly 22 may include a left rotatable length adjuster 68, and likewise the right lift link assembly 24 may include a right rotatable length adjuster 70.

An end of the left lift cylinder 18 may be rotatably coupled to a housing 32 of the work machine, and an opposite end of the left lift cylinder 18 may be coupled to the left rocker arm 14. An end of the right lift cylinder 20 may be rotatably coupled to the housing 32, and an opposite end of the right lift cylinder 20 may be coupled to the right rocker arm 16.

The upper link is positioned laterally between the lift link assemblies 22, 24 and is rotatably coupled to the housing 32 of the work machine.

The implement is mounted to the left draft link 26, the right draft link 28, and the upper link. When the lift cylinders 18, 20 extend outwards, the rocker arms 14, 16, the lift link assemblies 22, 24, the draft links 26, 28, and the implement (if mounted) rotate upwards. In contrast, when the lift cylinders 18, 20 retract inwards, the rocker arms 14, 16, the lift link assemblies 22, 24, the draft links 26, 28, and the implement (if mounted) rotate downwards.

In some embodiments of the three-point hitch 10, such as in the embodiment shown in FIG. 1, the lift link assemblies 22, 24 may be identical to one another. Thus, moving forward in the description, only the left lift link assembly 22 will be described in detail, as such a description is adequate to also describe the right lift link assembly 24.

Figure 2:
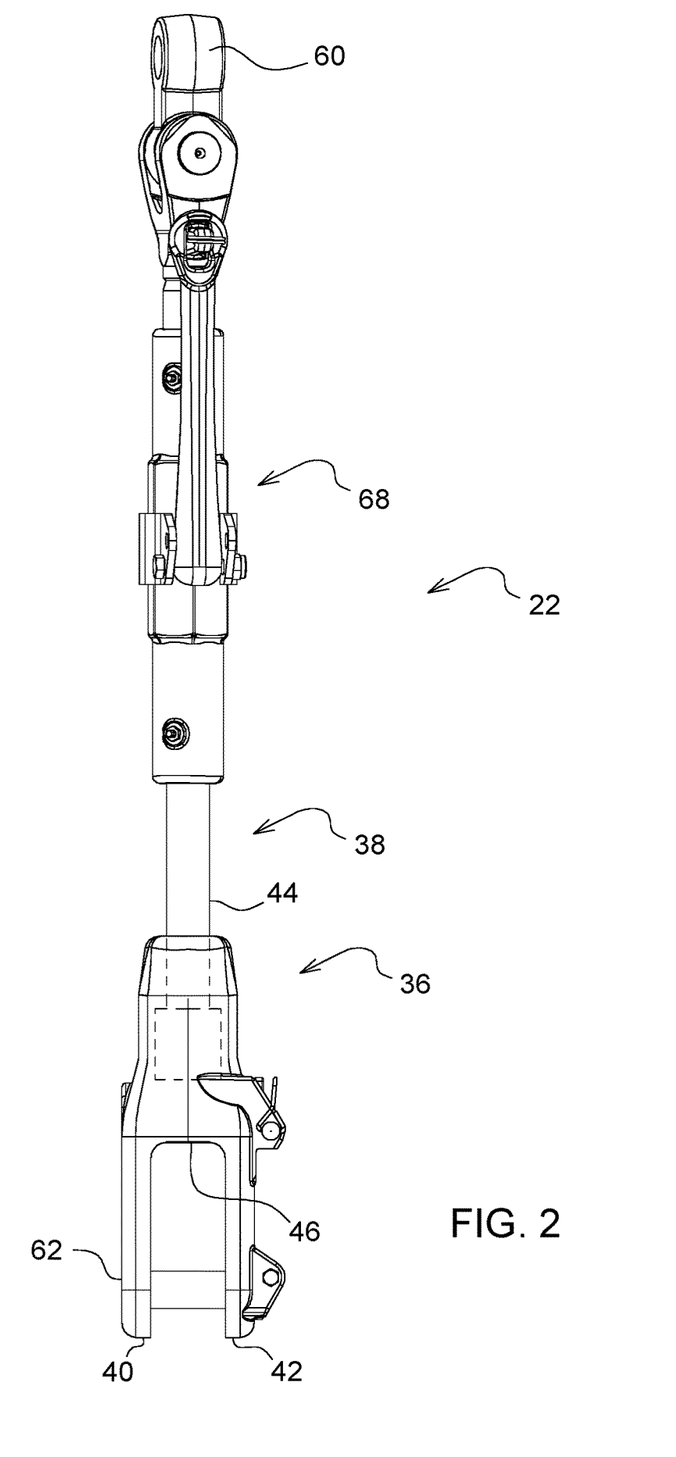
FIG. 2 is a front elevational view of a lift link assembly.
Figure 3:
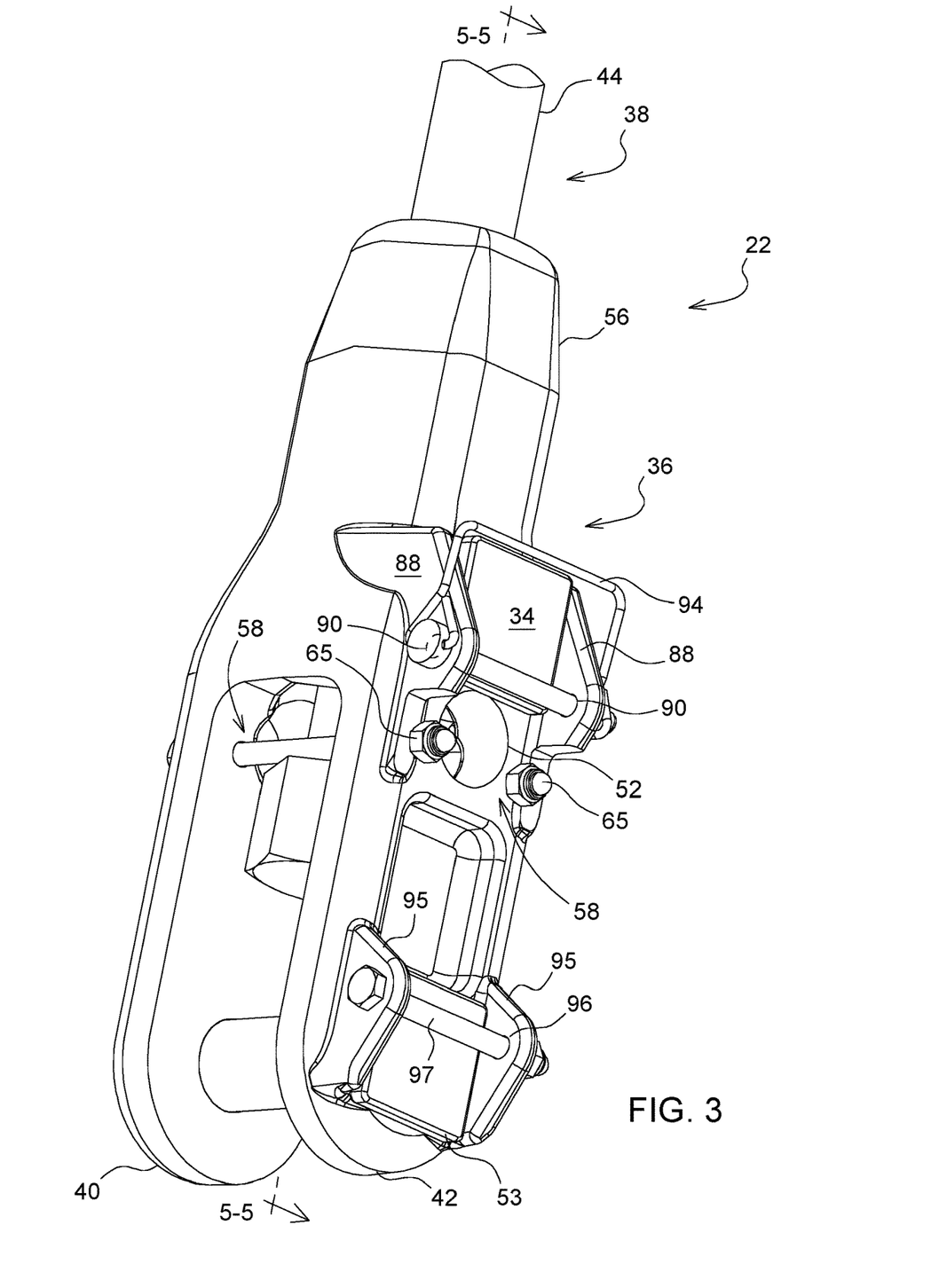
FIG. 3 is an enlarged perspective view of a portion of the lift link assembly.
Figure 4:
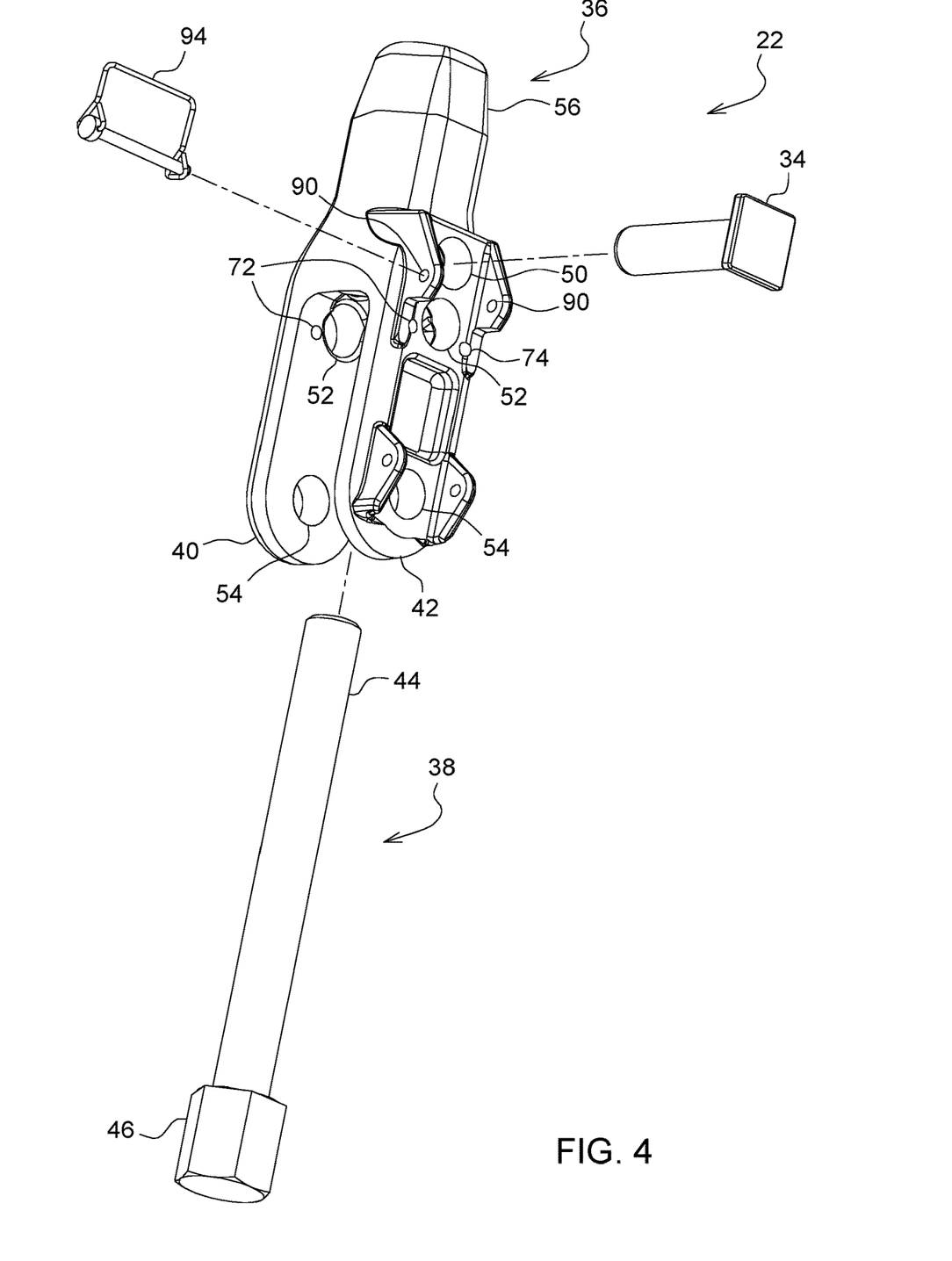
FIG. 4 is an exploded perspective view of the portion of the lift link assembly.

Referring to FIGS. 2-4, the lift link assembly 22 includes a pin 34, a yoke 36, a shaft 38, and a retractor 58. The yoke 36 includes a main housing 56, a first side arm 40, and a second side arm 42. The main housing 56 includes an upper-end through hole 48, and the first and second side arms 40, 42 extend downwardly from the main housing 56.

The shaft 38 includes a shank 44 and a head 46 positioned on a lower-end thereof. The shank 44 is positioned in the upper-end through hole 48.

At least one of the side arms 40, 42 may include an upper-mid through hole 50, a lower-mid through hole 52 positioned under the upper-mid through hole 50, and a lower through hole 54 positioned under the lower-mid through hole 52. In the illustrated embodiment, both of the side arms 40, 42 include an upper-mid through hole 50, a lower-mid through hole 52, and a lower through hole 54.

Figure 5:
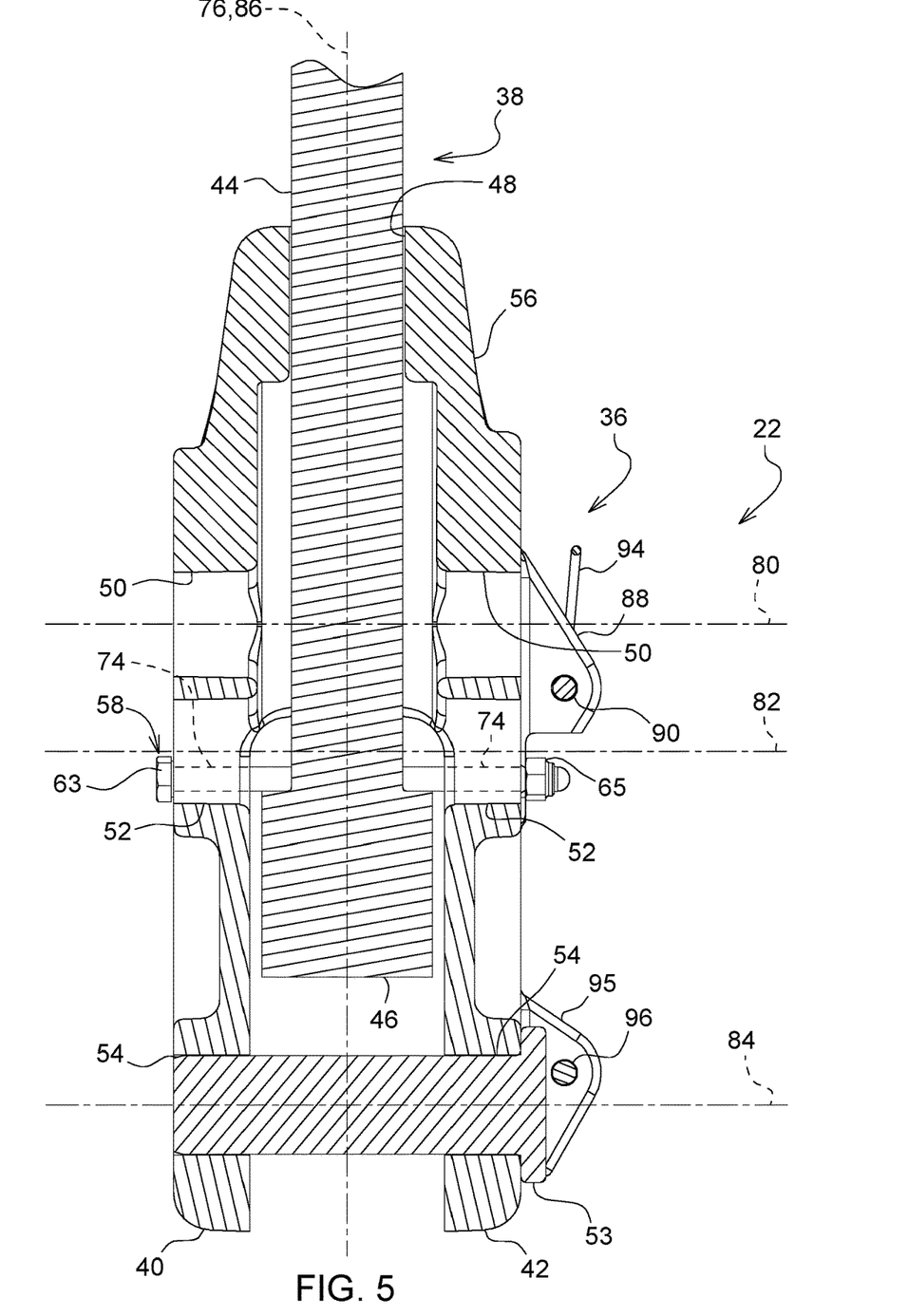
FIG. 5 is a sectional view of FIG. 3 taken along lines 5-5, showing the lift link assembly in a retracted mode.

An axis 76 defined by the upper-end though hole 48 may be oriented perpendicularly relative to an axis 80 defined by the upper-mid through holes 50, an axis 82 defined by the lower-mid through holes 52, an axis 78 defined by the rearward retractor through holes 72, an axis 79 defined by the forward retractor through holes 74, and an axis 84 defined by the lower through holes 54 (see FIG. 5). Additionally, the axis 76 defined by the upper-end through hole 48 may be aligned with an axis 86 defined by the shaft 38.

The pin 34 may be retained into position via a retaining pin 94. The retaining pin 94 may be, for example, a bolt, a cotter pin, or any other kind of member that may be inserted into one or more through holes and held in place. The retaining pin 94 may be positioned in retaining pin through holes 90. The retaining pin through holes 90 may be defined by a pair of plates 88 that extend laterally outwards from the yoke 36. The pair of plates 88 may be vertically oriented, and aligned and spaced apart from one another in a generally fore-and-aft direction.

A pin 53 may be positioned in the lower through holes 54, so as to couple the lift link assembly 22 to the draft link 26. The pin 53 may be retained into position via a retaining pin 97. The retaining pin 97 may be, for example, a bolt, a cotter pin, or any other kind of member that may be inserted into one or more through holes and held into place. The retaining pin 97 may be positioned in a pair of retaining pin through holes 96 that are defined by a pair of plates 95 that extend laterally outwards from the yoke 36. The pair of plates 95 may be vertically oriented, and aligned and spaced apart from one another in a generally fore-and-aft direction.

The positioning of the retractor 58 relative to the head 46 may define a distance between the first end 60 and the second end 62 of the lift link assembly 22. The operator may adjust the positioning of the pin 34 relative to the yoke 36, so as to retract and extend the lift link assembly 22 (and thus adjust how high and low the three-point hitch 10 and the implement may be able to travel). Further, the positioning of the adjuster 68 relative to the shaft 38 may also partially define the distance between the first end 60 and the second end 62. For example, the operator may turn the adjuster 68, which may be engaged with a threaded portion of the shaft 38, so as to retract and extend the lift link assembly 22 (and thus adjust how high and low the three-point hitch 10 and the implement may be able to travel).

Referring to FIG. 5, there is shown a sectional view of FIG. 3 taken along lines 5-5, showing the lift link assembly 22 in the retracted mode. In the retracted mode the retractor 58 is positioned above a top of the head 46, and the retractor 58 is configured to apply a downward force to the top of the head 46 and an upward force to the yoke 36.

In some embodiments, the retractor 58 may be a first retractor 58, and the lift link assembly 22 may also include a second retractor 58. The first retractor 58 may be positioned in the rearward retractor through holes 72, and the second retractor 58 may be positioned in the forward retractor through holes 74. In this position, the retractors 58 may be below the lower-mid through holes 52, but above the lower through holes 54. The first retractor 58 may include a first bolt 63 and a first nut 65 threaded onto the first bolt 63. Similarly, the second retractor 58 may include a second bolt 63 and a second nut 65 threaded onto the second bolt 63. When in the retracted mode, the first bolt 63 may be in contact with a rear portion of a top of the head 46, and the second bolt 63 may be in contact with a front portion of the top of the head 46.

When the lift link assembly 22 is in the retracted mode, the head 46 may be free to slide back and forth between a first position and a second position. In the first position, the head 46 may be in contact with the retractor 58. In the second position, the head 46 may be spaced apart from the retractor 58.

Figure 6:
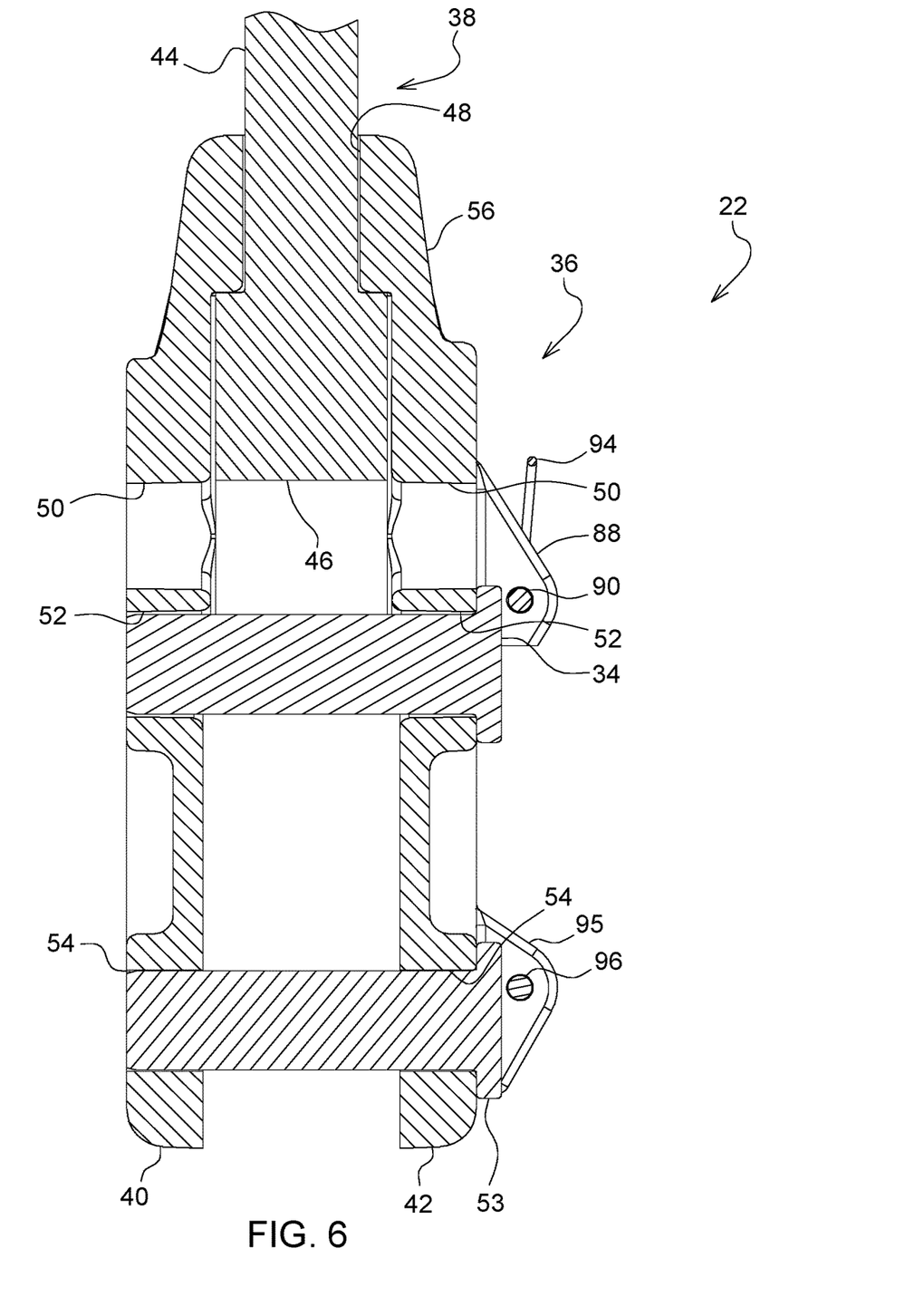
FIG. 6 is similar to FIG. 5, but showing the lift link assembly in a floating mode.

Referring to FIG. 6, the lift link assembly 22 is shown in the floating mode. In the floating mode, the pin 34 may be positioned below the head 46, and positioned in the lower-mid through holes 52 of the side arms 40, 42. The head 46 is free to slide back-and-forth relative to the pin 34 and relative to the yoke 36. As illustrated, the head 46 may be free to slide back-and-forth between a first position and a second position. The first position may be defined by a top point of contact between a top of the head 46 and an inner bottom of the main housing 56. When the head 46 is in the first position, it may be capped by the main housing 56. The second position may be defined by a bottom point of contact between a bottom of the head 46 and the pin 34. When the head 46 is in the second position, the head 46 may be aligned with the upper-mid through hole 50 or overlap the upper-mid through hole 50.

In some embodiments, in the floating mode, the first and second retractors 58 may need to be removed from the lift link assembly 22 (or at least removed from the holes 72, 74), such that the pin 34 may be positioned in the lower-mid through holes 52.

In the floating mode, portions of the three-point hitch 10 and the entire implement are free to float slightly up-and-down. The floating mode may be necessary for using certain implements and/or for operating in certain conditions.

Figure 7:
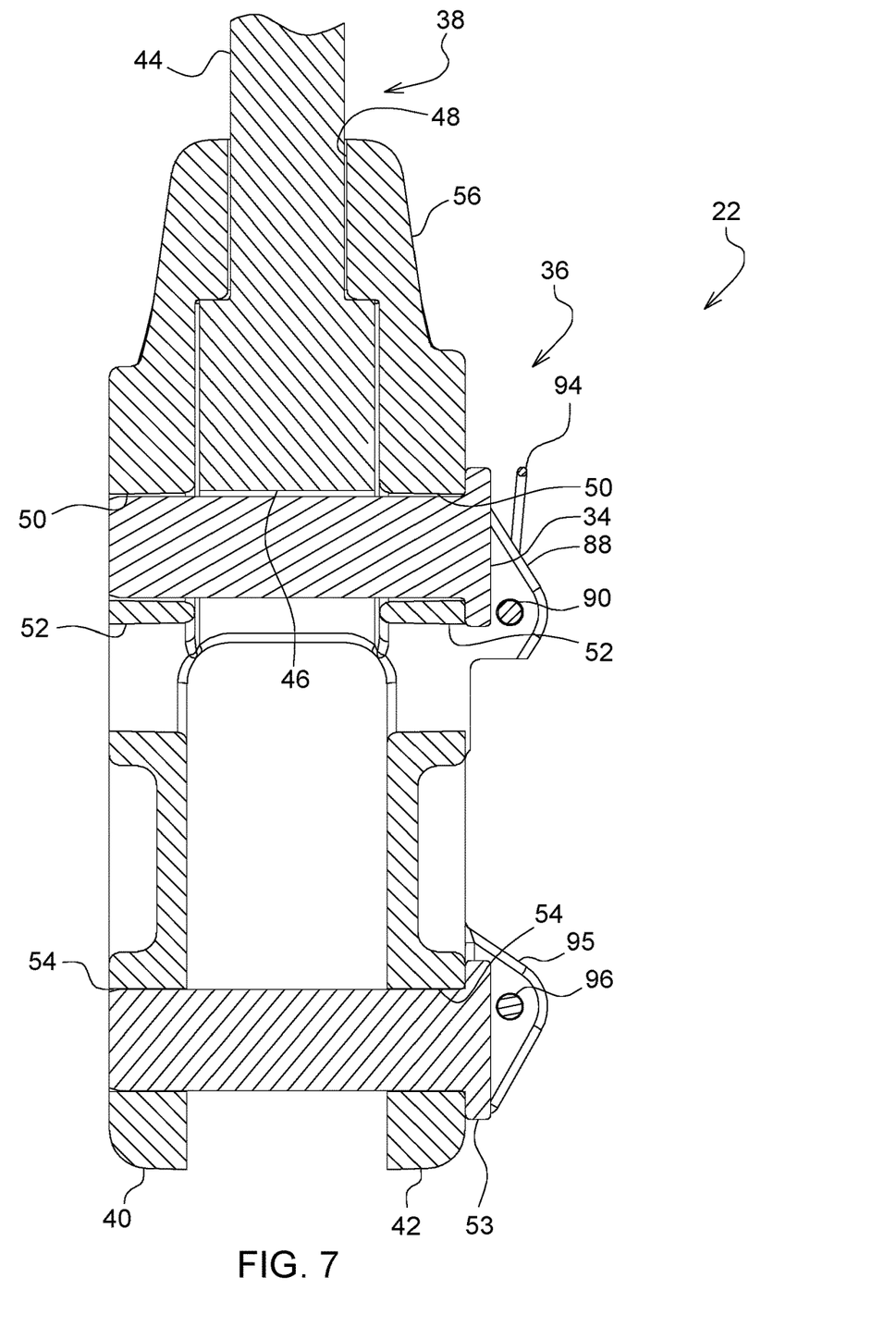
FIG. 7 is similar to FIG. 5, but showing the lift link assembly in an extended mode.

Referring to FIG. 7, the lift link assembly 22 is shown in the extended mode. In other respects, FIG. 7 is similar to FIG. 6. In the extended mode, the pin 34 may be positioned in the upper-mid through holes 50, the head 46 may be positioned above the pin 34, and the retractor 58 may be positioned below the pin 34. The head 46 is sandwiched between the main housing 56 and the pin 34, but the head 46 is spaced apart from the retractor 58.

Further, when the lift link assembly 22 is in an extended mode, the head 46 may be in contact with the pin 34 and in contact with the main housing 56, such that the head 46 is substantially fixed relative to the pin 34 and substantially fixed relative to the yoke 36. In the extended mode, portions of the three-point hitch 10 and the entire implement may be lowered to a lower operating position (than would be possible in a three-point hitch 10 that lowers via only lift cylinders 18, 20 and the adjusters 68, 70). The lower operating position may be necessary for using certain implements.

Figure 8:
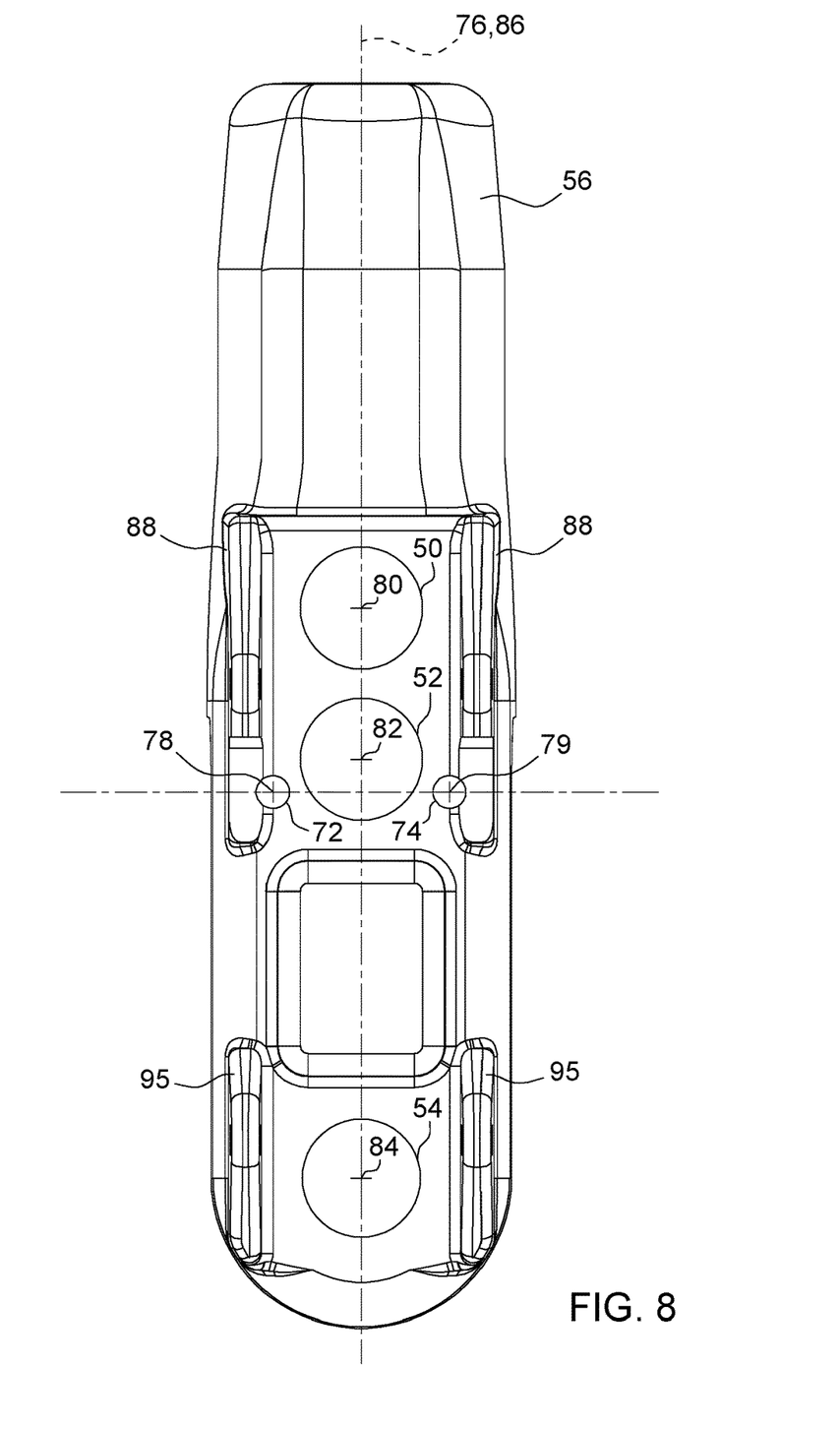
FIG. 8 is a side view of a yoke of the lift link assembly.

Referring to FIG. 8, as shown, the upper-mid through holes 50, the lower-mid through holes 52, and the lower through holes 54 may be vertically aligned. The rearward retractor through holes 72 may be offset rearwards relative to the upper-mid through holes 50, the lower-mid through holes 52, and the lower through holes 54. In contrast, the forward retractor through holes 74 may be offset forwards relative to the upper-mid through holes 50, the lower-mid through holes 52, and the lower through holes 54. The rearward retractor through holes 72 may be horizontally aligned with the rearward retractor through holes 72.

In the retracted mode, portions of the three-point hitch 10 and the entire implement may be raised to a higher operating position (than would be possible in an otherwise identical three-point hitch that raises via only the lift cylinders 18 and the adjuster 68). The higher operating position may be necessary for there to be (1) clearance between an implement that is mounted to the three-point hitch 10 and the ground and/or (2) clearance between the implement (e.g., plow) and a secondary implement (e.g., wagon) that is being pulled by a drawbar of a work machine.

Use of the retractor 58 may increase the overall flexibility and distance between the very lowest and highest operating positions of the three-point hitch 10, in contrast to an otherwise identical three-point hitch that includes only lift cylinders 18 and the adjuster 68.

Further, use of the retractor 58 may negate the need for making as many changes via the adjuster 68. For example, the operator may switch between using and transporting the implement by adjusting only the location of the shaft 38 and head 46 relative to the retractor 58.

Still further, use of the retractor 58 may provide for easily repeatable adjustments of the three-point hitch 10. In contrast, using the adjuster 68 may not be easily repeatable, as most operators do not remember how many times to rotate or counter rotate the adjuster 68 to get back to a previous, and desirable, position thereof.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A lift link assembly of a three-point hitch, the lift link assembly comprising:
    a yoke comprising a main housing and first and second side arms that extend downwardly therefrom, the main housing comprising an upper-end through hole;
    a shaft comprising a shank and a head positioned on a lower-end thereof, the shank being positioned in the upper-end through hole; and
    a retractor, wherein when the lift link assembly is in a retracted mode:
        the retractor is positioned above the head;
        the retractor is configured to apply a downward force to the head;
        the retractor is configured to apply an upward force to the yoke; and
        the retractor comprises a fastener that is in contact with a top of the head.

2. The lift link assembly of claim 1, wherein the fastener comprises a bolt and a nut that is threaded onto the bolt, and the bolt is in contact with a top of the head when the lift link assembly is in the retracted mode.

3. The lift link assembly of claim 1, wherein when the lift link assembly is in the retracted mode:
    the retractor is positioned above a top of the head, and the retractor is configured to apply the downward force to the top of the head.

4. The lift link assembly of claim 1, wherein a first end of the lift link assembly is configured to be rotatably coupled to a rocker arm, a second end of the lift link assembly is configured to be rotatably coupled to a draft link, and a position of the retractor relative to the head defines a distance between the first end and the second end.

5. The lift link assembly of claim 1, wherein at least one of the first and second side arms comprise an upper-mid through hole, a lower-mid through hole positioned under the upper-mid through hole, and a lower through hole positioned under the lower-mid through hole, and the retractor is configured to be positioned below the lower-mid through hole and above the lower through hole when the lift link assembly is in the retracted mode.

6. The lift link assembly of claim 5, wherein the retractor is configured to be positioned above and in contact with a top of the head when the lift link assembly is in the retracted mode.

7. The lift link assembly of claim 5, further comprising a pin, wherein when the lift link assembly is in an extended mode:
    the pin is positioned in the upper-mid through hole;
    the head is positioned above the pin; and
    the retractor is positioned below the pin.

8. The lift link assembly of claim 7, wherein when the lift link assembly is in the extended mode, the head is sandwiched between the main housing and the pin, the head is spaced apart from the retractor.

9. The lift link assembly of claim 5, further comprising a pin, wherein when the lift link assembly is in a floating mode:
    the pin is positioned in the lower-mid through hole;
    the head is positioned above the pin; and
    the retractor is positioned below the pin.

10. The lift link assembly of claim 9, wherein when the lift link assembly is in the floating mode, the head is free to slide back and forth between (A) a first position defined by a top point of contact between a top of the head and an inner bottom of the main housing and (B) a second position defined by a bottom point of contact between a bottom of the head and the pin.

11. The lift link assembly of claim 5, wherein when the lift link assembly is in the retracted mode, the head is free to slide back and forth between a first position in which the head is in contact with the retractor and a second position in which the head is spaced apart from the retractor.

12. The lift link assembly of claim 11, wherein a top of the head is in contact with a bottom of the retractor when in the first position.

13. A lift link assembly of a three-point hitch, the lift link assembly comprising:
    a yoke comprising a main housing and first and second side arms that extend downwardly therefrom, the main housing comprising an upper-end through hole;
    a shaft comprising a shank and a head positioned on a lower-end thereof, the shank being positioned in the upper-end through hole; and
    a retractor, wherein when the lift link assembly is in a retracted mode:
        the retractor is positioned above the head;
        the retractor is configured to apply a downward force to the head; and
        the retractor is configured to apply an upward force to the yoke;

wherein each of the first and second side arms comprises an upper-mid through hole, a lower-mid through hole positioned under the upper-mid through hole, a retractor through hole positioned under the lower-mid through hole, and a lower through hole positioned under the retractor through hole, and the retractor is positioned in the retractor through holes when the lift link assembly is in the retracted mode.

14. The lift link assembly of claim 13, wherein the upper-mid through holes, the lower-mid through holes, and the lower through holes are vertically aligned, and the retractor through holes are offset one of rearwards and forwards relative to the upper-mid through holes, the lower-mid through holes, and the lower through holes.

15. The lift link assembly of claim 14, wherein an axis defined by the upper-end through hole is oriented perpendicularly relative to:
   an axis defined by the upper-mid through holes;
   an axis defined by the lower-mid through holes;
   an axis defined by the retractor through holes; and
   an axis defined by the lower through holes.

16. The lift link assembly of claim 14, wherein:
   the retractor through holes are rearward retractor through holes that are offset rearwards relative to the upper-mid through holes, the lower-mid through holes, and the lower through holes; and
   each of the first and second side arms further comprises a forward retractor through hole that is horizontally aligned with the rearward retractor through holes, the forward retractor through holes are offset forwards relative to the upper-mid through holes, the lower-mid through holes, and the lower through holes.

17. The lift link assembly of claim 16, wherein an axis defined by the upper-end through hole is oriented perpendicularly relative to:
   an axis defined by the upper-mid through holes;
   an axis defined by the lower-mid through holes;
   an axis defined by the rearward retractor through holes;
   an axis defined by the forward retractor through holes; and
   an axis defined by the lower through holes.

18. The lift link assembly of claim 16, wherein the retractor is positioned in the rearward retractor through holes when the lift link assembly is in the retracted mode.

19. The lift link assembly of claim 16, wherein the retractor is a first retractor, and the lift link assembly further comprises a second retractor, and when the lift link assembly is in the retracted mode:
   the first retractor is positioned in the rearward retractor through holes, and
   the second retractor is positioned in the forward retractor through holes.

20. The lift link assembly of claim 19, wherein the first retractor comprises a first bolt and a first nut threaded onto the first bolt, the second retractor comprises a second bolt and a second nut threaded onto the second bolt, when the lift link assembly is in the retracted mode:
   the first bolt is in contact with a rear portion of a top of the head, and
   the second bolt is in contact with a front portion of a top of the head.

* * * * *